US010288504B2

(12) United States Patent
Hu et al.

(10) Patent No.: US 10,288,504 B2
(45) Date of Patent: May 14, 2019

(54) AXIAL ROTATION TYPE TORQUE SENSOR (71) Applicant: PRODRIVES & MOTIONS CO., LTD., New Taipei (TW)

(72) Inventors: Yueh-Yang Hu, New Taipei (TW); Chih-Cheng Chou, New Taipei (TW); Meng-Jen Chiu, New Taipei (TW)

(73) Assignee: PRODRIVES & MOTIONS CO., LTD., New Taipei (TW)

( * ) Notice: Subject to any disclaimer, the term of this patent is extended or adjusted under 35 U.S.C. 154(b) by 0 days.

(21) Appl. No.: 15/811,396

(22) Filed: Nov. 13, 2017

(65) Prior Publication Data
US 2018/0149533 A1 May 31, 2018

(30) Foreign Application Priority Data
Nov. 30, 2016 (TW) .............................. 105139461 A (51) Int. Cl.
*G01L 5/00* (2006.01)
*B25B 23/14* (2006.01)
*B25B 23/147* (2006.01)
*G01L 3/14* (2006.01)

(52) U.S. Cl.
CPC ............ *G01L 5/0042* (2013.01); *B25B 23/14* (2013.01); *B25B 23/147* (2013.01); *G01L 3/1471* (2013.01)

(58) Field of Classification Search
CPC ...... G01L 5/0042; B25B 23/14; B25B 23/147
USPC .................................................... 73/862.321
See application file for complete search history.

(56) References Cited

U.S. PATENT DOCUMENTS

| 5,172,774 | A | | 12/1992 | Melrose | |
|---|---|---|---|---|---|
| 5,263,906 | A | * | 11/1993 | Antonov | ................. F16D 13/74 475/257 |
| 5,465,819 | A | * | 11/1995 | Weilant | ................. B60K 17/20 192/35 |
| 8,302,702 | B2 | | 11/2012 | Hansson | |
| 2005/0043135 | A1 | * | 2/2005 | Potter | ................... B23Q 5/142 475/298 |
| 2008/0098863 | A1 | * | 5/2008 | Kaneyama | ............ B23P 19/066 81/468 |

(Continued)

FOREIGN PATENT DOCUMENTS

TW M417320 U1 12/2011
TW M451316 U1 4/2013

*Primary Examiner* — Max H Noori
(74) *Attorney, Agent, or Firm* — Chun-Ming Shih (57) ABSTRACT

The present invention provides an axial rotary type torque sensor comprising a planetary gear set disposed along a central axis between an input shaft and an output shaft. The input shaft drives the sun gear which meshes with planetary gears, and the planetary gears mesh with the ring gear of the planetary gear set to rotate along the circumference of the central axis. The ring gear is connected with a plurality of strip-like beams. At least one strain gauge is attached to the beams. One ending portion of the beam is fixed and the other ending portion is used for bearing a tangential force applied on the ring gear to generate a deformation at a rotation direction of a circumference. A strain gauge which senses the strain of the deformation used as a torque sensing value between the input shaft and the output shaft, thereby improving the poor sensing accuracy and sensitivity of the conventional torque sensors and solving the problem that the radial volume cannot be effectively reduced.

9 Claims, 7 Drawing Sheets

(56) References Cited

U.S. PATENT DOCUMENTS

| | | | |
|---|---|---|---|
| 2009/0277658 A1* | 11/2009 | Chen | B23B 45/008 |
| | | | 173/183 |
| 2010/0139432 A1 | 6/2010 | Steckel et al. | |
| 2015/0135856 A1 | 5/2015 | Kim et al. | |
| 2017/0184466 A1* | 6/2017 | Liang | G01L 3/1471 |

* cited by examiner

AXIAL ROTATION TYPE TORQUE SENSOR

FIELD OF THE INVENTION

The present invention relates to a torque sensing technique in which a strain gauge is mounted in a rotary drive mechanism, and more particularly to an axial rotation type torque sensor.

PRIOR ARTS OF THE INVENTION

The traditional rotary drive mechanism is usually equipped with a torque sensing element to detect the torque values. For the mechanism of torque transmitting, how to accurately detect the torque value, and to effectively reduce the size of the volume of the torque sensing components has long been a difficult tough task.

It is known that U.S. Pat. Nos. 5,172,774, 8,302,702, U.S. Patent Publication No. 20100139432, U.S. Patent Publication No. 20150135856, Taiwan Patent Publication No. M451316, and Taiwan Patent Publication No. M417320 commonly teach a strain gauge used as a sensing element to measure the torque value of the driving mechanism.

The general strain gauges consists of an insulating flexible backing which supports a metallic foil pattern. Both ends of them have connectors for connecting to the strain gauge signal processing module. In application, the strain gauge can be attached to the mechanical components which will be deformed when it is subjected to the force. When the strain gauge deformed with the object where it attached to, it is possible to obtain the response of the strain of the mechanical components through the change of the resistance values of the strain gauge, and then to determine the torque values in the rotary driving mechanism.

The inadequate torque sensing structure and the position where the strain gauge is attached to disclosed in the above patents could result in a poor torque sensing capability, and there is a problem that the volume of the torque sensing structure is too large.

For example, U.S. Pat. No. 5,177,774 teaches a plurality of strain gauges to be directly disposed on a plurality of shear webs formed by a torque-imparting gear that can be guided along the radial web of the gear. The shear webs can transmit the strain of the shear webs generated on the shear web surface of the radial shear web. However, the sensed strain includes both the forward strain and the shear strain, the resulting strain does not adequately represent the variation of the torque value of the gear, thus losing the authenticity and accuracy of the torque sensing. Alternatively it needs to configure the strain gauges of more direction of to sense the forward strain and shear direction of the strain, forcing its cost and complexity relatively to increase. In addition, the radial distance between the position of the strain gauge and the gear axis on the shear webs should be large enough to help to sense the more obvious forward strain and the shear strain, but it resulting difficulty and troubles of reducing the radial volume of the structure.

U.S. Patent Publication No. 20100139432 discloses a torque transducer which is fixed to the housing and is pivot on the torsion axis. The transducer has a central hub pivotally connected to the torque axis. The web is formed in a disk-like web with a ring, and at least one strain gauge is attached to the web as the carrier object to sense the torque of the torque shaft. Since the web is formed as a ring in disk-shape form, the force formed and transformed by the torque is difficult to be transmitted in a centralized way. In other words, the strain generated by the torsional transmission of the web will be dispersed over the entire area of the ring-shaped web, thereby reducing the amount of deformation generated by the strain gauge, and even reducing relatively the authenticity and accuracy of the torque sensing. The use of structural design of web parts equipped with a strain gauge still faces the problem of increasing radial volume.

As disclosed in U.S. Pat. No. 8,302,702, the strain gauge is attached to a radial ribbed plane of a frame-shaped torque transferring element. The center of the torque transferring element is connected to a ring gear and the strain gauge is used to measure the torque of the ring gear. However, for the strain gauge between the side rib plane of the torque transferring element and the axis of the ring gear, the force is transmitted by the engagement portions at the periphery of the torque transferring element, thus the engaging location of the strain gauge is subjected to bending moment. The bending moment generated by the engagement portions to be used to sense the authenticity and accuracy of the torque change is relatively weak, and at the rib of the torque transferring element, the problem of larger radial volume still exist.

U.S. Pat. No. 2,050,135,856 discloses a wheeled type force torque sensor for detecting the force or torque generated instantaneously when a system is obstructed, generally as a safety protection use. The center of the force torque sensor is also formed with a hub for the axially connecting to the rotating element, and the radial periphery of the force torque sensor is also formed with a rim. A plurality of different beams are formed at the radial direction between the periphery of the hub and the rim position. The strain gauge can be respectively fixed on the radial side of the periphery surface of the beams. By the use of the various beams, the beam bending load of the beam is guided to produce the strain on the beam bending load generated by a tensile effect force or a compression force or a shear force, so that the strain gauge on the beam surface can sense the strain generated on the beam, and then the detection of the force and torque value are obtained. However, this patent does not further disclose how the tensile effect force or the compression force or the shear force on the beam is guided with the load in more details. Therefore it is necessary to fix the strain gauges on the peripheral surface of each beam and to increase the accuracy of its measurement, but it causes the application of the more amount of strain gauges and the complexity of the stress structure. Moreover, the beam also has problem of increasing the radial volume of the structure.

In addition, Taiwan Patent Publication No. M451316 and Taiwan Patent Publication No. M417320 respectively discloses that a sleeve is provided on the crankshaft with a strain gauge attached to the surface of the sleeve for measuring the strain generated by exerted torque effect of the sleeve. The measured amount of strain is converted into a strain signal to control the power output of the electric motor. Although the design of the sleeve with the strain gauge can achieve the effect of reducing the radial volume of the structure, the strain gauge is mounted on the moving part (sleeve), it must be equipped with energy transmission components, such as transformers, wireless transmission elements, etc. When these accessories are installed on the moving parts (sleeve), it increases the configuration space, thereby resulting in more large structure.

SUMMARY OF THE INVENTION

In view of the above, an objective of the present invention is to improve the conventional torque sensing structure provided with a strain gauge, which has insufficient sensing accuracy and sensitivity, and to solve a problem that the radial volume cannot be effectively reduced.

In order to achieve the above object and solve the above problems, the present invention utilizes the characteristics in which a beam of the torque sensing plate, when it is axially formed, is stressed and is deformed and can be equipped with a strain gauge to accurately and sensitively sense the variation of the torque of an application element or device. The position of the beam of the torque sensing plate is designed to overcome the problem that the radial volume of the application element or device cannot be effectively reduced.

According to a preferred embodiment of the present invention, here is an axial rotation type torque sensor comprising:

an input shaft and an output shaft spaced apart along a central axis;
a planetary gear set co-axially disposed between the input shaft and the output shaft, the input shaft being axially connected to a sun gear of the planetary gear set, the output shaft being connected to a plurality of the planetary gears by means of a planetary carrier disk, a ring gear of the planetary gear set being connected to a torque sensing plate, the torque sensing plate having a plurality of sheet-like beams parallel to the central axis, a radial surface parallel to the central axis being respectively formed at an opposite side of the beams, at least one strain gauge being disposed on at least one of the surfaces;
wherein the input shaft drives the output shaft to move by means of the planetary gear set, a tangential force is formed to drive the ring gear to rotate along a circumference of the central axis, the beam of the torque sensing plate bears the tangential force from the ring gear and deformed at a rotation direction of the circumference, and the torque sensing plate senses the deformation to generate a strain to be used as a toque sensing value between the input shaft and the output shaft.

In a further implementation of the above technical solution of the present invention, the torque sensing plate preferably comprises a fixing seat and a rotation seat, and the beam is disposed between the fixing seat and the rotation seat.

According to the present invention, the torque sensing plate is preferably formed by integrating the fixing seat, the beams and the rotation seat.

According to the present invention, the beam is preferably formed by extending from the fixing seat, and one end of the beam located distantly from the fixing seat is assembled on the rotation seat.

According to the present invention, a hole is respectively arranged and disposed at a center of the fixing seat and the rotation seat, and the input shaft extends through the holes to co-axially connect to the sun gear.

According to the present invention, the input shaft is pivotally connected to one of the fixing seat or the rotation seat.

According to the present invention, for the beams of the strain gauges the amount of the strain gauges is two and the two strain gauges are relatively applied to the two corresponding surfaces of the beams.

According to the present invention, the planetary gear set comprises:

a first stage planetary gear set, the input shaft being co-axially fixed to a first stage sun gear of the first stage planetary gear set, a plurality of first stage planetary gears engaging with the first stage planetary gear set at a circumference of the first stage sun gear being pivotally disposed at a first stage planetary carrier disk of the first stage planetary gear set, the torque sensing plate being connected at a first stage ring gear of the first stage planetary gear set; and a second stage planetary gear set, a second stage sun gear of the second stage planetary gear set being co-axially fixed at a center of the first stage planetary carrier disk, the output shaft being connected to a plurality of second stage planetary gears engaging with the second stage sun gears of the second stage planetary gear set via a second stage planetary carrier disk of the second stage planetary gear set, the first stage planetary gear and the second stage planetary gear respectively engaging with the first stage ring gear.

According to the present invention, the second stage planetary carrier disk is preferably formed by extending from the output shaft.

According to the present invention, an object to be axially connected to the input shaft is exchanged by an object to be connected to the output shaft.

According to the present invention, the planetary carrier disk is preferably formed by extending from the output shaft.

According to the present invention, an object to be co-axially connected to the input shaft is exchanged by an object to be connected to the output shaft.

According to the above technical proposal, the technical effects of the invention are that:

1. The tangential force the ring gear bear is the reaction force applied from the input shaft, the beam is sufficiently pushed and deformed to generate strain by using the tangential force, thereby causing the strain gauge to senses the deformation, in order to enhance the sensitivity of torque sensing by the strain gauge.

2. Application of the flat beam to carry the strain gauge applied with the force can deform more sensitively, and further improve the torque sensitivity of the strain gauge.

3. The beam is arranged parallel to each other along the axial direction of the input shaft, rather than the radial configuration along the input shaft, which can effectively reduce the radial volume of the application element or device or torque sensor.

The technical details of the above described apparatus and the specific implementation details thereof will be described with reference to the following embodiments and the drawings.

DETAILED DESCRIPTION OF THE INVENTION

First, please refer to FIGS. 1 to 4, which disclose a first embodiment of the torque sensing device according to the present invention, which shows that the torque sensing device comprises an input shaft 20, an output shaft 30, a planetary gear set, a torque sensing plate 50 and a strain gauge 60.

Figure 1:
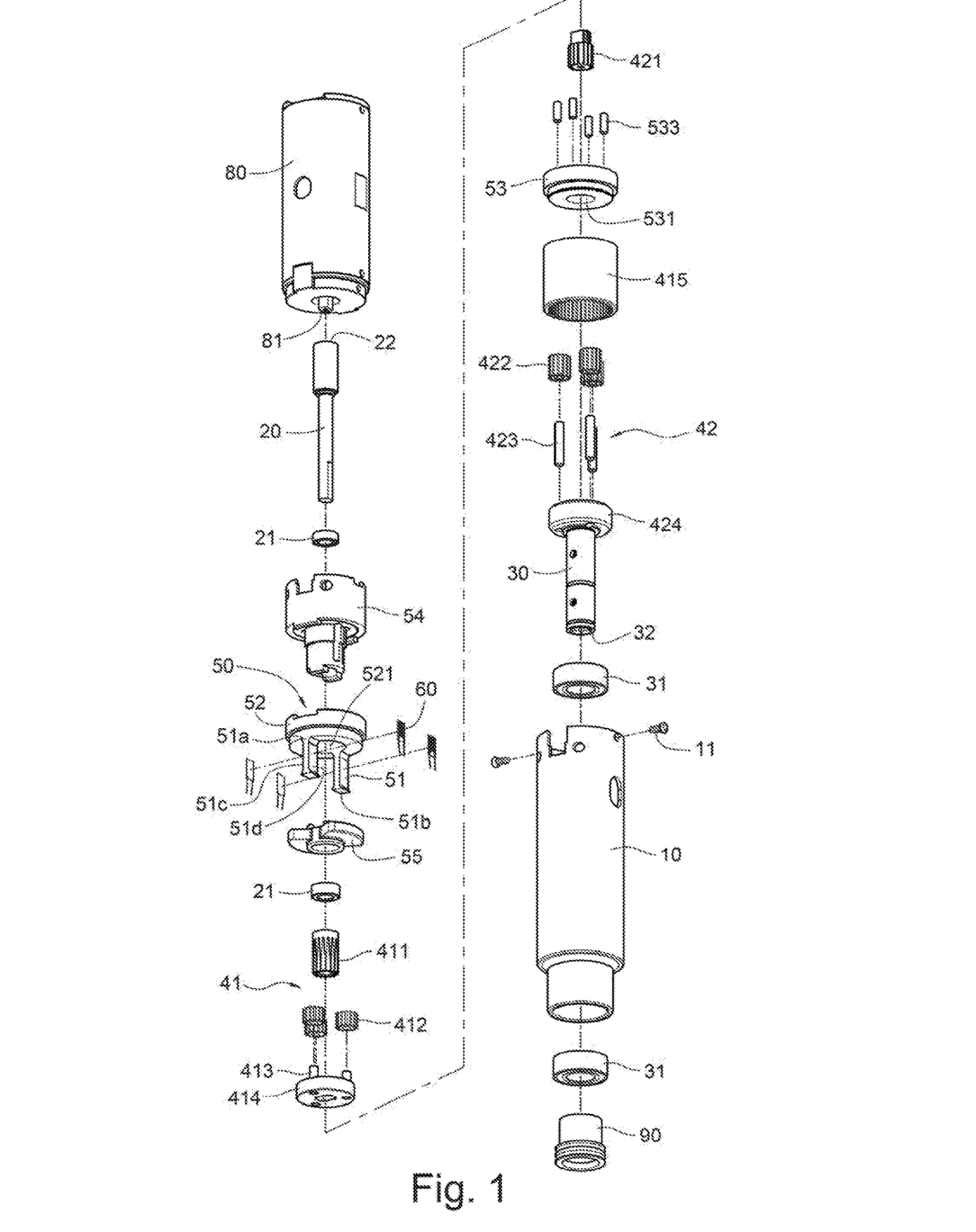
FIG. 1 is a perspective exploded view of a first embodiment of an axial rotation type torque sensor of the present invention.
Figure 2:
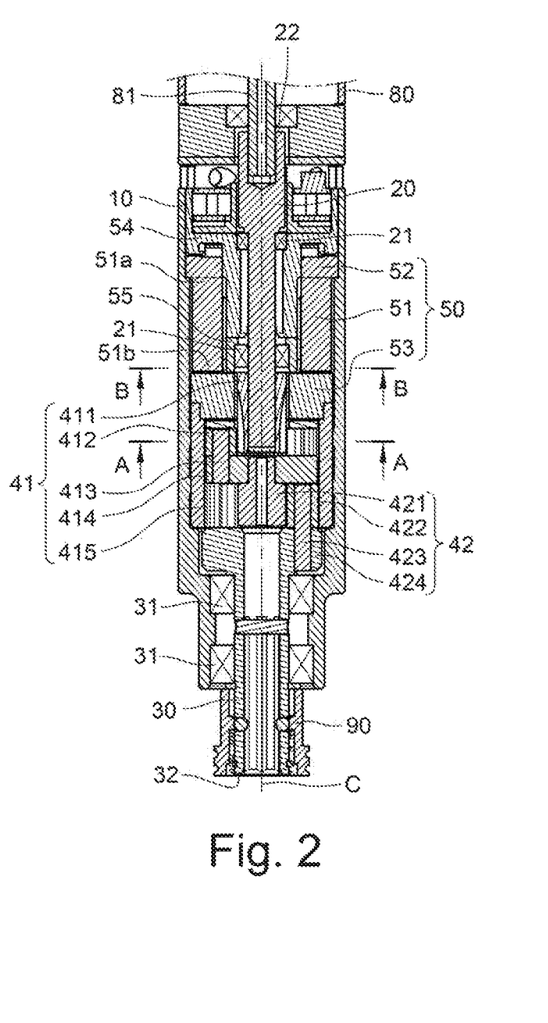
FIG. 2 is a cross-sectional view taken after the combination of the axial rotation type torque sensor of FIG. 1 of the present invention.

As shown in FIGS. 1 and 2, the input shaft 20 and the output shaft 30 are spaced apart along a central axis C which is disposed between the input shaft 20 and the output shaft 30 along the central axis C. The planetary gear set, the input shaft 20 and the output shaft 30 are housed in a housing 10 which is implemented as a fixed end of the entire device body for pivoting the input shaft 20 and the output shaft 30. Further, the input shaft 20 and the output shaft 30 may be pivotally housed in the housing 10 via a first bearing 21 and a second bearing 31, respectively. A first terminal 22 and second terminal 32 of the input shaft 20 and the output shaft 30 are respectively projected outside of the housing 10. The housing 10 is provided with a driving motor 80 which is integrally combined with a mechanical arrangement such as an insert, a buckle or a lock so that the driving shaft 81 of the driving motor 80 can be axially connected to the input shaft 20 for driving the input shaft 20 to rotate. The output shaft 30 is axially fitted with a tool joint 90 for engaging and outputting torque to drive, for example, a tool such as an electric screwdriver.

Figure 3:
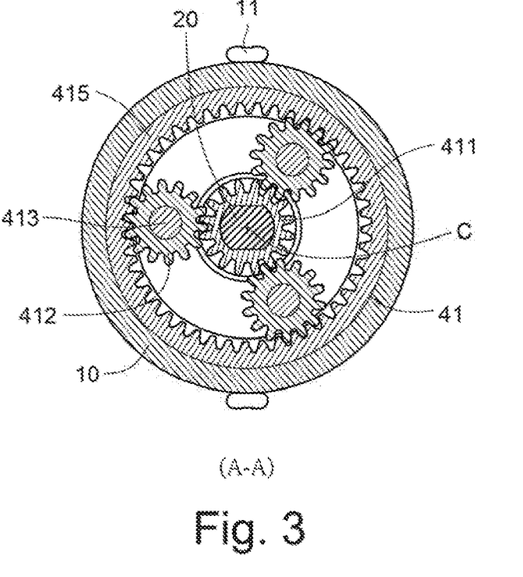
FIG. 3 is a cross-sectional view taken along line A-A in FIG. 2 of the present invention.

The specific arrangement details between the planetary gear set and the input shaft 20 and the output shaft 30 are further shown in FIG. 3, and the input shaft 20 and the output shaft 30 are interconnected by means of a planetary gear set. The planetary gear set includes, on an implementation, a first stage planetary gear set 41 and a second stage planetary gear set 42 in which a first terminal 22 of the input shaft 20 protrudes beyond the housing 10 and an another terminal extends into the housing 10 to be axially connected to the first stage sun gear 411 of the first stage planetary gear set 41.

The first stage sun gear 411 has a plurality of first stage planetary gears 412 in a first stage planetary gear set 41. The plurality of first stage planetary gears 412 are pivotally mounted on a first stage planetary carrier disk 414 in the first stage planetary gear set 41. The first stage sun gear 411 in the first stage planetary gear set 41 is surrounded by the first stage ring gear 415 and the first stage planetary gears 412. The first stage planetary gears 412 are respectively meshed with the first stage sun gear 411 and the first stage ring gear 415.

Further, the above-described first stage planetary gear 412 is, on its implementation, pivoted on one side of the first stage planetary carrier disk 414 via the first stage planetary gear shaft 413. The second stage sun gear 421 in the second stage planetary gear set 42 is axially connected to a center of the another side of the first stage planetary carrier disk 414 by means of the second stage planetary carrier disk 424 in the second stage planetary gear set 42. The output shaft 30 is connected to a plurality of second stage planetary gears 422 in the second stage planetary gear set 42 meshing around the second stage sun gear 421. The second stage planetary gears 422 is implemented on the second stage planetary carrier disk 424 via the second stage planetary gear shaft 423. The second stage planetary gears 422 and the first stage planetary gears 412 are implemented in a group that meshes with the first stage ring gear 415, respectively. The second stage planetary carrier disk 424 is formed by extending of the output shaft 30, that is, the output shaft 30 is co-axially formed integrally with the second stage planetary carrier disk 424. In addition, the connecting target of the input shaft 20 and the connecting target of the output shaft 30 is interchangeable, i.e., the input shaft 20 is axially coupled to the second stage planetary carrier disk 424 and the output shaft 30 is axially coupled to the first stage sun gear 411 and is also intended for use in the present invention. It is obvious to change the driving object and order of the input force into that of the output force.

Please refer to FIGS. 1 and 2 demonstrating the first stage ring gear 415 is shown to be connected to a torque sensing plate 50 having a plurality of beams 51 parallel to the central axis C, a fixing seat 52 and a rotation seat 53. The fixing seat 52 and the rotation seat 53 are spaced apart from each other and disposed along the central axis C. The beams 51 is located between the fixing seat 52 and the rotation seat 53. The beams 51 are in the form of a strip or plate-like body, and at least one strain gauge 60 must be attached to the sheet body of at least one of the beams 51. The so-called "at least one of the beam 51" refers that one or more of the beams 51 in a plurality of beams 51 may be attached with a strain gauge 60 on the sheet-body of the beams 51. The amount of the application of the strain gauge 60 attached to the beam may be one or two pieces. When the amount of strain gauges 56 attached to the single beam portion 51 is two, the two strain gauges 60 may be attached to the opposite sides of the first surface 51*c* and the second surface 51*d* at the opposite side of the sheet body of the beams 51. The first surface 51*c* and the second surface 51*d* are parallel to the radial direction of the central axis C. The beams 51 may be formed by, for example, a sheet-like body made of metal such as carbon steel so that the respective sections of the beam 51 can exhibit the same cross-section or permitting the force to generate strain under the allowed strength of the metal material to be used, and thus being used as the carrier of the strain gauge 60.

As each beam 51 has a first ending portion 51*a* and a second ending portion 51*b*, the first ending portion 51*a* must be fixed and the second ending portion 51*b* is used for bearing the tangential force applied from the first stage ring gear 415. Furthermore, the first ending portion 51*a* of the beam portion 51 is fixed to the fixing seat 52. The beam 51 is formed by extending of the fixing seat 52. The fixing seat 52 is mounted on a base 54 which is secured in the housing 10 in such a manner as to be locked by the assembly of the screw 11 so as to be served as a fixed end of the entire device body. The beam 51 is used for bearing the tangential force applied from the first stage ring gear 415. The second ending portion 51*b* is slidably or fixedly arranged on the rotation seat 53.

Figure 9:
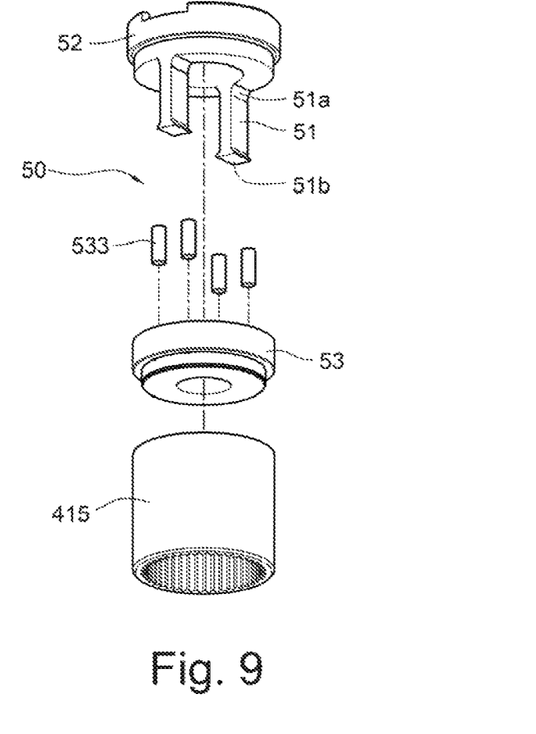
FIGS. 9 and 10 are respectively perspective views of the divergent structure of the torque sensing plate of the present invention.
Figure 10:
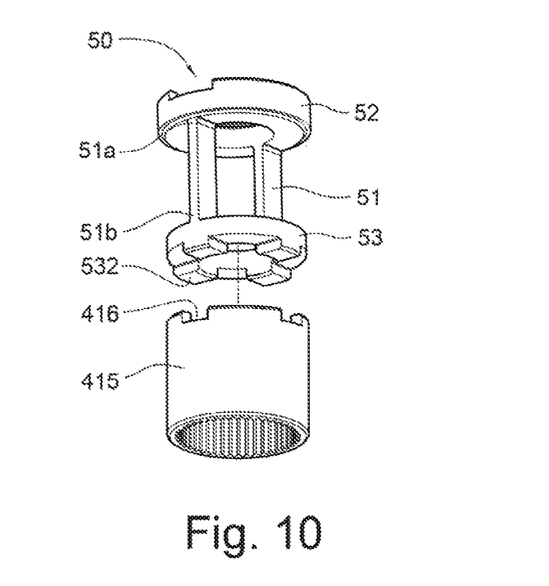

As shown in FIGS. 1 and 2, it is described that the torque sensing plate 50 is connected to the first stage ring gear 415 via the rotation seat 53 so that the first stage ring gear 415 is driven by the first stage planetary gear 412 and the second stage planetary gear 422 to further rotate the rotation seat 53 along the central axis C. Furthermore, the rotation seat 53 can be fitted into the first stage ring gear 415 in a interference fit so as to be connected integrally (as shown in FIG. 9). Alternatively at one end of the rotation seat 53 a plurality of protrusions 532 are formed by extending. At one end of the first stage ring gear 415 a plurality of groove 416 corresponding to the protrusions 532 are formed by grooving. The rotation seat 53 and the first stage ring gear 415 are integrally connected by the combination of the protrusions 532 and the grooves 416 (as shown in FIG. 10).

Figure 4:
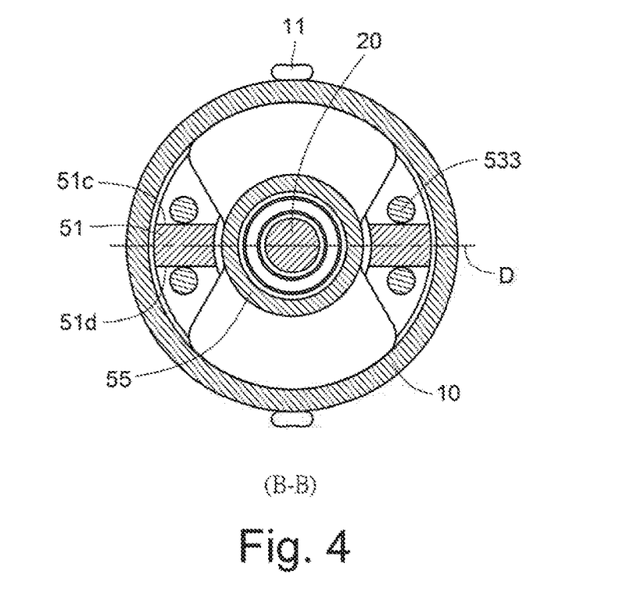
FIG. 4 is a cross-sectional view taken along line B-B of FIG. 2 of the present invention.

In addition, at the fixing seat 52 and the center of the rotation seat 53 a first hole 521 and a second hole 531 are respectively formed for passing through of the input shaft 20 so that the fixing seat 52 and the rotation seat 53 are arranged symmetrically on the input shaft 20 along the central axis C. The input shaft 20 passes through the first hole 521 and the second hole 531 of the fixing seat 52 and the rotation seat 53 to axially drive the first stage sun gear 411. Further, the beams 51 are disposed between the fixing seat 52 and the rotation seat 53 respectively so that the beams 51 are located on the radial line D of the central axis C (as shown in FIG. 4). In the present invention, the amount of the beams 51 is only two. In addition, a bearing holder 55 is provided between the fixing seat 52 and the rotation seat 53. One of the bearings 21 is housed in the bearing holder 55, thereby maintaining the stability when the input shaft 20 is rotated.

Figure 5:
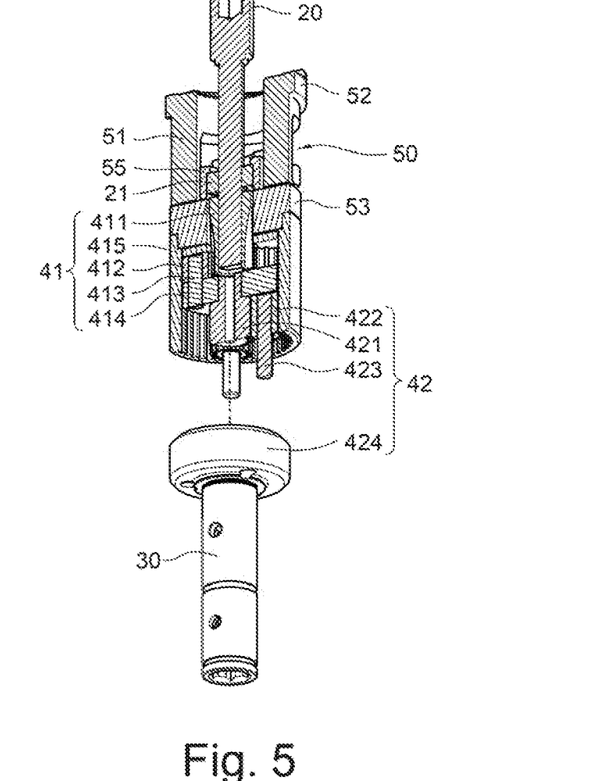
FIG. 5 is a perspective view of the partial members of FIG. 1 of the present invention.
Figure 6:
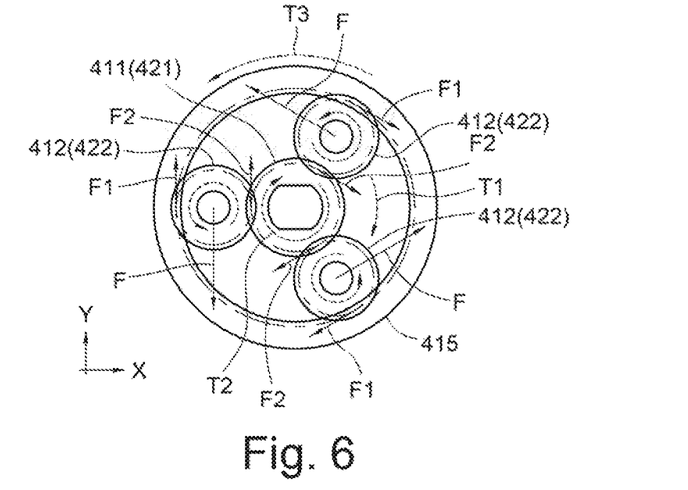
FIG. 6 is an explanatory view of the forces generated by the planetary gear set in FIG. 3 of the present invention.

As shown in FIGS. 5 and 6, it is described that when the first stage sun gear 411 used as the input end is rotated in the clockwise direction, the first stage planetary gear 412 is driven to rotate in the counterclockwise direction and the first stage planetary carrier disk 414 is rotated in the clockwise direction. Thus, the second stage sun gear 421 is rotated in the clockwise direction via the driving of the first stage planetary carrier disk 414 and the second stage planetary gear 422 is rotated in the counterclockwise direction. The second stage planetary gear 422 drives the second stage planetary carrier disk 424 as the output end to rotate in the clockwise direction to output power.

Since the second stage planetary carrier disk 424 must bears the external torsional load T1, the first stage sun gear 411 will input the torque T2 and the torque obtained by multiplying the T2 by the reduction ratio is to be balanced against T1 so as to form a torsional load T3 on the first stage ring gear 415. In this way, $$T3 = T1 \times (\lambda/(1+\lambda)) \qquad \text{Equation (1)}$$

$$T2 = T3 \times (\lambda/(1+\lambda)) \qquad \text{Equation (2)}$$

Wherein $\lambda$ is the gear ratio between the first stage sun gear 411 and the first stage ring gear 415 ($\lambda$=ratio of the number of teeth of the first stage sun gear 411 divided by the number of teeth of the first stage ring gear 415).

Please refer to FIGS. 5 and 6, it is described that at a meshing point between the first stage sun gear 411 and the first stage planetary gear 412 and the second stage sun gear 421 and the second stage planetary gear 422, a second tangential force F2 is respectively formed. At a meshing point between the first stage ring gear 415 and the first stage planetary gear 412 and the second stage planetary gear 422, a first tangential force F1 is respectively formed. The second tangential force F2 and the first tangential force F1 are parallel to each other. According to the moment balance theorem $\Sigma M_x = 0$, we know that M=0=F1×r−F2×r, F=F1+F2, so F1=F2=F/2, so the sum of the tangential force (F1+F2) generates a reaction force F. The reaction force F respectively drives the first stage planetary carrier disk 414 and the second stage planetary carrier disk 424 to rotate via the planetary gear shafts 413, 423.

Figure 7:
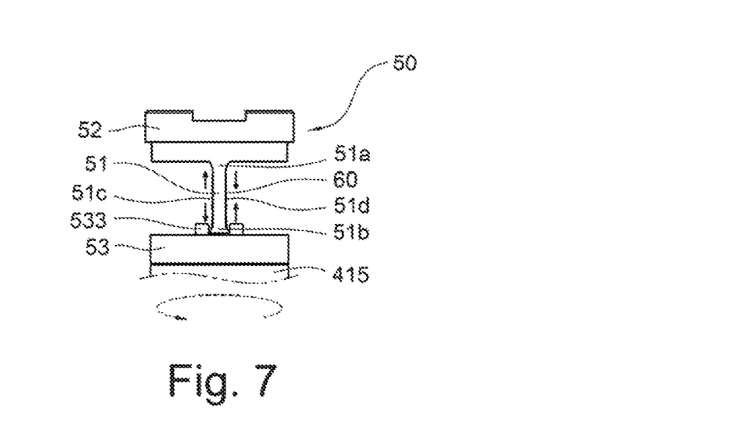
FIG. 7 is a schematic view of the bending of the beam by the rotation seat of the present invention.

Please refer to FIG. 7, it is described that the first ending portions 51a of the beams 51 are respectively fixed to the fixing seat 52, and the second ending portions 51b of the beams 51 are slidably in contact with the rotation seat 53. In this configuration, when the rotation seat 53 is rotated by the tangential force F1 transmitted by the first stage ring gear 415 to drive the beams 51, the first ending portion 51a of each beam 51 is fixed. On the contrary, the second ending portion 51b of each beam 51 is slightly moved by the little rotation of the rotation seat 53, and the beam 51 is deformed, and the first ending surface 51c of each beam 51 is subjected to a tensile force and the second ending surface 51d is under pressure. Thus, at least one piece of strain gauge 60 mounted on at least one of the beams 51 is subjected to a bending deformation in synchronism to generate strain as a torque sensing value between the input shaft 20 and the output shaft 30. In addition, it is necessary to note that if the second ending portion 51b of the beam 51 is bonded to the rotation seat 53 in a fixed manner, the second ending portion 51b is not in contact with the rotation seat 53. When the second ending portion 51b is moved by the slight rotation of the rotation seat 53, the strain gauge 60 can be deformed to generate the strain by the deformation in the same state.

Figure 8A:
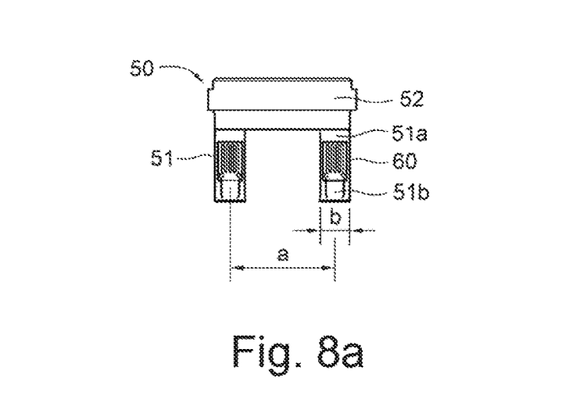
FIGS. 8a and 8b are respectively front and side views of the beam of the present invention.
Figure 8B:
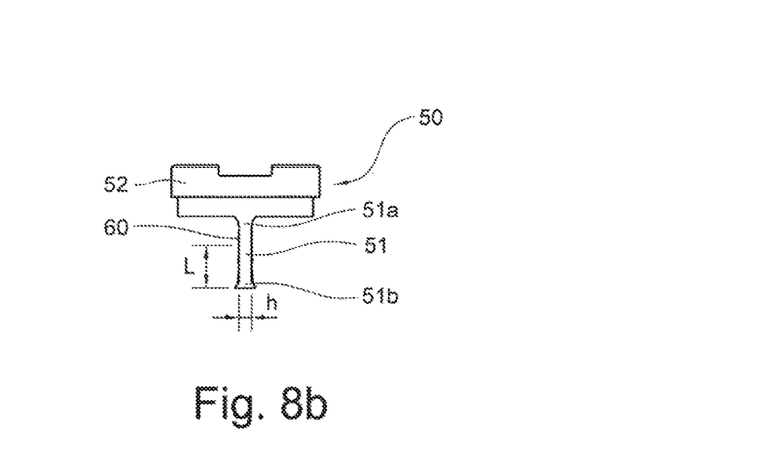
Figure 11:
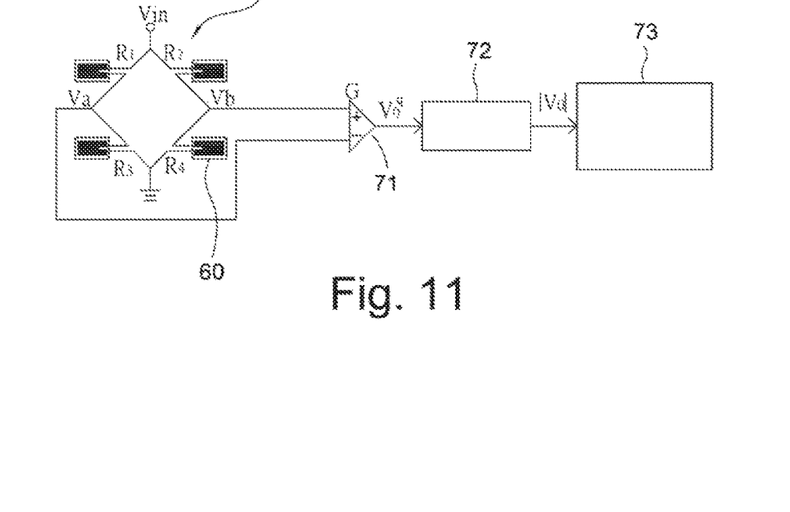
FIG. 11 is a circuit diagram of the strain gauge of the present invention.

Please refer to FIGS. 8a, 8b, and 11, demonstrating the first ending portion 51a of the beam 51 is fixed to the housing 10 via the fixing seat 52 (see FIG. 8a, FIG. 8b, and FIG. 11) when the rotation seat 53 is driven by the tangential force F1 transmitted by the first stage ring gear 415. Therefore, the beam 51 is bent by the rotation of the rotation seat 53, so that one side of the beam 51 is pressed by the pressure and another side of the beam 51 is pressed by stress. When the strain gauge 60 is affixed to both sides of the beam 51, the change in the sensed resistance value can be accurately and sensitively sensed using the bridge circuit 70 by using a formula.

When the relative distance between the two beams 51 is set to a, the amount is N, the width is b and the thickness is h, the force F' on the single beam 51 is as following Equation (3):

$$F' = 2 \times T3/(a \times N) \qquad \text{Equation (3)}$$

When the distance between the center of the strain gauge 60 and the force point (i.e., the second end portion 51b) is L, the stress value induced by the strain gauge 60 is $\sigma = 6 \times F' \times L/(b \times h^2)$, and strain $\varepsilon$ is as following Equation (4):

$$\varepsilon = 6 \times F' \times L/(E \times b h^2) \qquad \text{Equation (4)}$$

Wherein the position at the L of the strain gauge 60 is determined by taking into account the ease of assembly and the amount of deformation that can produce the greatest amount of deformation, for example, the fitting position of the strain gauge 60 on the beam 51 can be relatively closer to the fixing seat 52 and relatively remote from the rotation seat 53 in order to generate a larger strain and for facilitating more accurately obtaining accurate torque measurement values.

The formula of the bridge circuit 70 is expressed by the following equation (5):

$$V_{ab} = V_b - V_a = \left(\frac{R_4}{R_2 + R_4} - \frac{R_3}{R_1 + R_3}\right) \times V_{in} \qquad \text{Equation (5)}$$

Where $V_{in}$ is the input voltage of the power supply terminal, $V_{ab}$ is the voltage difference between the voltage $V_b$ at point b and the voltage $V_a$ at point a. $R_1$, $R_2$, $R_3$ and R$_4$ are the resistors fixed to the beam 51 respectively. When the strain gauge 60 is contracted or is subject to tensile force, the resistance values of R$_1$, R$_2$, R$_3$ and R$_4$ will change, for the resistors R$_2$ and R$_3$ the amount of resistance change is −ΔR when they are subjected to the force, and for resistance R$_1$ and R$_4$ the amount of resistance change is ΔR, so that the resistance value R$_2$=R$_3$=R−ΔR and R$_1$=R$_4$=R+ΔR are brought into the above equation (5), the following equation (6) is obtained:

$$V_{ab} = \left(\frac{R+\Delta R}{R-\Delta R+R+\Delta R} - \frac{R-\Delta R}{R-\Delta R+R+\Delta R}\right) \times V_{in} = \quad \text{Equation (6)}$$

$$\left(\frac{R+\Delta R}{2R} - \frac{R-\Delta R}{2R}\right) \times V_{in} = \frac{\Delta R}{R} \times V_{in}$$

V$_{ab}$ is calculated by the G times magnification of the instrument amplifier 71, then the output voltage V$_o$ is obtained by the following equation (7)

$$V_o = G \times V_{ab} \quad \text{Equation (7)}$$

The relationship between the strain and the output voltage is obtained by the relationship that the strain is generated from the beam 51 by the torque force ΔR/R=GF×ε

$$V_o = G \times GF \times \varepsilon \times V_{in} \quad \text{Equation (8)}$$

Wherein GF is the strain coefficient. The output voltage V$_o$ is rectified by the rectifier 72 and then supplied to a micro control unit (MCU) 73 for using the varying value of the output voltage V$_o$ as the strain generated by the torque applied to the beam 51 and for converting and calculating the accurate torque sensing values between the input shaft 20 and the first stage ring gear 415.

In the case of the application of the strain gauge 60, the amount of change of use in four strain gauges is twice the amount of change in the two strain gauges, and is about four times the amount of change in the one strain gauge. Thus, in the present invention, the greater the amount of configurations of the strain gauge 60, the more sensitive the torque sensing value that can be obtained and converted. However, the amount of configurations of strain gauge 60 is not limited to four.

Please refer to FIGS. 9 and 10, it can be seen from the above descriptions that the beam 51 in the torque sensing plate 50 is formed by the fixing seat 52 by extending. The second ending portion 51b of the beam 51 for absorbing the tangential force F1 exerted on the first stage ring gear 415 be connected to the rotation seat 53 in a sliding or fixed manner. As shown in FIG. 9, the rotation seat 53 is provided with a plurality of stoppers 533. The amount of stoppers 533 is twice the amount of the beam 51. The stoppers 533 are located on both sides of the beams 51 so that the beams 51 are slidably arranged between the two sides of the stoppers 533. The beams 51 can be driven to rotate by the rotation of the rotation seat 53 via the beams 51 fixed to the stoppers 533 to cause the beams 51 to be bent and deformed. As shown in FIG. 10, the torque sensing plate 50 may be formed into an integral piece by integrating the fixing seat 52, the rotation seat 53 and the beam portions 51 so that the beams 51 can be deformed when the rotation seat 53 is rotated to drive the beams 51.

Figure 12:
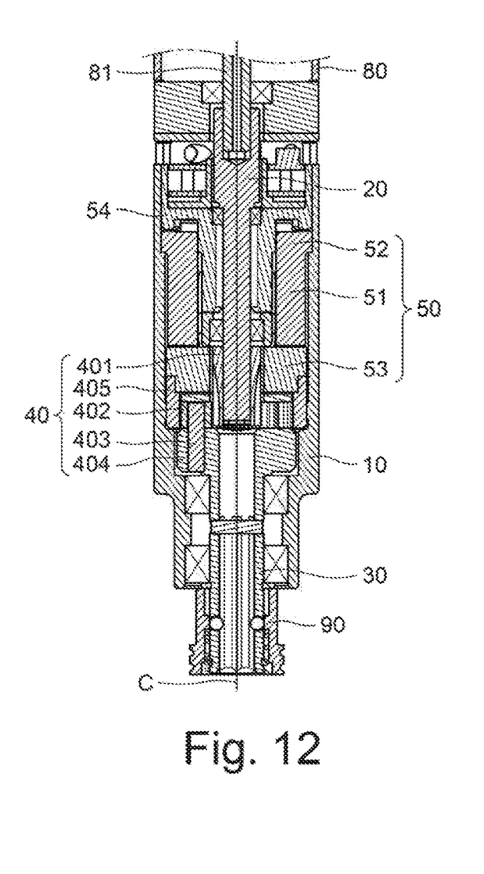
FIG. 12 is a cross-sectional view of a second embodiment of an axial rotation type torque sensor of the present invention.

Please refer to FIG. 12, demonstrating the present invention provides a second embodiment of the axial rotation type torque sensor disclosed which differs from the above-described first embodiment in that the planetary gear set of the present embodiment is a single planetary gear set 40. One end of the input shaft 20 extending into the housing 10 is co-axially connected to the third sun gear 401 in the third planetary gear set 40. The output shaft 30 is connected to a plurality of third planetary gears 402 in the third planetary gear set 40 which meshes with the third sun gear 401 via the third planetary carrier disk 404 in the third planetary gear set 40. The third ring gear 405 in the third planetary gear set 40 surrounds the periphery of the third sun gear 401 and the third planetary gears 402. The third sun gear 401 and the third internal gears 405 are meshed with the third planetary gears 402 respectively. Further, the third planetary gear 402 is pivotally mounted on the third planetary carrier disk 404 via the third planetary gear shaft 403. The third planetary carrier disk 404 is formed by extending from the output shaft 30, that is, the output shaft 30 is co-axially formed integrally with the third planetary carrier disk 404. The connecting target of the input shaft 20 can be interchangeable with the connecting target of the output shaft 30, that is, the input shaft 20 is co-axially connected to the third planetary carrier disk 404, and the output shaft 30 is co-axially connected to the third sun gear 401, and is also a subject of the present invention, so that the driving object and the sequence can be easily changed.

According to the descriptions of the above embodiments, the present invention utilizes the one ending portion of the sheet-like beams 51 to be more sensitive to deform in the tensioned state, and the strain gauge 60 is deformed accordingly, the present invention is feasible and enhances the accuracy of sensing torque. In addition, it is possible to effectively reduce the radial volume of the application element or the apparatus or the torque sensor by arranging the beams 51 in parallel with the axial direction of the input shaft 20, rather than being arranged in the radial direction of the input shaft 20 and to be able to contribute to the prior arts.

It is to be understood, however, that the above embodiments are merely illustrative of preferred embodiments of the invention, but are not to be construed as limiting the scope of the invention. Accordingly, the present invention should be based upon the terms of the claims that are limited to the scope of the patent application.

We claim:

1. An axial rotation type torque sensor comprising:
   an input shaft and an output shaft extending and spaced apart along a central axis;
   a planetary gear set extending along the central axis and disposed between the input shaft and the output shaft, the input shaft being co-axially connected to a sun gear of the planetary gear set, the output shaft being connected to a plurality of the planetary gears by means of a planetary carrier disk, a ring gear of the planetary gear set being connected to a torque sensing plate, the torque sensing plate having a plurality of sheet-like beams extending parallel to the central axis, a radial ending surface extending parallel to the central axis being respectively formed at an opposite side of the beams, at least one strain gauge being disposed on at least one of the ending surfaces;
   wherein the input shaft drives the output shaft to move by means of the planetary gear set, a tangential force is formed to drive the ring gear to rotate along a circumference of the central axis, the beam of the torque sensing plate bears the tangential force from the ring gear to generate deformation at a rotational direction of the circumference, and the torque sensing plate senses the deformation to generate a strain to be used as a toque sensing value between the input shaft and the output shaft;

wherein the torque sensing plate comprises a fixing seat and a rotation seat, and the beam is disposed between the fixing seat and the rotation seat;

wherein a hole is respectively arranged and disposed at a center of the fixing seat and the rotation seat, and the input shaft extends through the holes to axially connect to the sun gear;

wherein the input shaft is pivotally connected to one of the fixing seat and the rotation seat.

2. The axial rotation type torque sensor as claimed in claim 1, wherein the torque sensing plate is formed by integrating the fixing seat, the beams and the rotation seat into an integral piece.

3. The axial rotation type torque sensor as claimed in claim 1, wherein the beam is formed by extending from the fixing seat, and one end of the beam located distant from the fixing seat is assembled on the rotation seat.

4. The axial rotation type torque sensor as claimed in claim 1, wherein for the beams of the strain gauges the amount of the strain gauges is two and the two strain gauges are relatively applied to the two corresponding ending surfaces of the beams.

5. The axial rotation type torque sensor as claimed in claim 1, wherein the planetary gear set comprises:

a first stage planetary gear set, the input shaft being axially fixed to a first stage sun gear of the first stage planetary gear set, a plurality of first stage planetary gears engaging with the first stage planetary gear set at a circumference of the first stage sun gear being pivotally disposed at a first stage planetary carrier disk of the first stage planetary gear set, the torque sensing plate being fixed with a first stage ring gear of the first stage planetary gear set; and a second stage planetary gear set, a second stage sun gear of the second stage planetary gear set being axially connected at a center of the first stage planetary carrier disk, the output shaft being connected to a plurality of second stage planetary gears engaging with the second stage sun gears of the second stage planetary gear set via a second stage planetary carrier disk of the second stage planetary gear set, the first stage planetary gear and the second stage planetary gear respectively engaging with the first stage ring gear.

6. The axial rotation type torque sensor as claimed in claim 5, wherein the second stage planetary carrier disk is formed by extending from the output shaft.

7. The axial rotation type torque sensor as claimed in claim 5, wherein an object to be axially connected to the input shaft is exchanged by an object to be connected to the output shaft.

8. The axial rotation type torque sensor as claimed in claim 1, wherein the planetary carrier disk is formed by extending from the output shaft.

9. The axial rotation type torque sensor as claimed in claim 8, wherein an object to be axially connected to the input shaft is exchanged by an object to be connected to the output shaft.

* * * * *